United States Patent
Jeong

(10) Patent No.: US 11,225,245 B2
(45) Date of Patent: Jan. 18, 2022

(54) VEHICLE AND METHOD FOR CONTROLLING THE SAME

(71) Applicants: Hyundai Motor Company, Seoul (KR); Kia Motors Corporation, Seoul (KR)

(72) Inventor: Seok Min Jeong, Suwon-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 284 days.

(21) Appl. No.: 16/548,102

(22) Filed: Aug. 22, 2019

(65) Prior Publication Data
US 2020/0180602 A1 Jun. 11, 2020

(30) Foreign Application Priority Data

Dec. 7, 2018 (KR) .................. 10-2018-0157529

(51) Int. Cl.
*B60W 20/20* (2016.01)
*B60W 20/40* (2016.01)
*B60W 10/06* (2006.01)
*B60W 10/08* (2006.01)
*B60W 30/18* (2012.01)

(52) U.S. Cl.
CPC .......... *B60W 20/20* (2013.01); *B60W 10/06* (2013.01); *B60W 10/08* (2013.01); *B60W 20/40* (2013.01); *B60W 30/18063* (2013.01); *B60W 2420/52* (2013.01); *B60W 2510/18* (2013.01); *B60W 2510/244* (2013.01); *B60W 2554/80* (2020.02);

(Continued)

(58) Field of Classification Search
CPC ...... B60W 20/20; B60W 20/40; B60W 10/06; B60W 10/08; B60W 30/18063; B60W 2554/80; B60W 2556/45; B60W 2510/244; B60W 2510/18; B60W 2720/103; B60W 2420/52; B60W 2720/10; B60W 2710/083; B60W 2556/65; B60W 10/02; B60W 10/26
See application file for complete search history.

(56) References Cited

U.S. PATENT DOCUMENTS

2009/0305844 A1* 12/2009 Klump .................. F16D 48/06
477/71
2016/0090073 A1* 3/2016 Huh ...................... B60W 20/30
701/22

(Continued)

*Primary Examiner* — Marthe Y Marc-Coleman
(74) *Attorney, Agent, or Firm* — Morgan, Lewis & Bockius LLP

(57) ABSTRACT

To minimize a pedal operation of a driver and to provide convenience of driving by flexibly controlling a maximum creep speed during a creep driving in a traffic congestion section, a vehicle includes: a radar configured to obtain speed information of a preceding vehicle and distance information to the preceding vehicle; a sensor configured to acquire behavior information of the vehicle; a controller configured to determine whether or not the vehicle has entered the traffic congestion section based on the behavior information of the vehicle, to determine a safety distance and a surplus distance related to the preceding vehicle, to determine a maximum creep speed and a creep torque based on the surplus distance, and to control operation of at least one of a motor or an engine to transmit the creep torque to a wheel of the vehicle.

18 Claims, 8 Drawing Sheets

(52) U.S. Cl.
CPC ... *B60W 2556/45* (2020.02); *B60W 2720/103* (2013.01)

(56) References Cited

U.S. PATENT DOCUMENTS

2016/0304091 A1* 10/2016 Remes .................. B60W 50/12
2018/0113448 A1* 4/2018 Nagda .................. G05D 1/0293

* cited by examiner

FIG.5

| SPEED OF VEHICLE[kph] | 0 | 10 | 20 | 30 | 40 |
|---|---|---|---|---|---|
| SAFETY FACTOR($F_{reaction}$) | 0 | 0.1 | 0.3 | 0.5 | 0.7 |

FIG.6

| SURPLUS DISTANCE[m] | 0 | 5 | 10 | 15 | 20 |
|---|---|---|---|---|---|
| MAXIMUM CREEP SPEED($V_{max}$) [kph] | $V_{default}$ | $V_{default}+2$ | $V_{default}+5$ | $V_{default}+8$ | $V_{default}+12$ |

VEHICLE AND METHOD FOR CONTROLLING THE SAME

CROSS-REFERENCE TO RELATED APPLICATION(S)

This application is based on and claims the benefit of priority to Korean Patent Application No. 10-2018-0157529, filed on Dec. 7, 2018 in the Korean Intellectual Property Office, the entire disclosure of which is incorporated by reference.

TECHNICAL FIELD

The present disclosure relate to a vehicle and a method of controlling the vehicle that can minimize pedal operations of a driver during a creep driving in a traffic congestion section and provide driving convenience.

BACKGROUND

Generally, an electric vehicle (EV), a hybrid electric vehicle (HEV), and a fuel cell vehicle, which are environmentally friendly vehicles, can be driven by the power of a motor powered by a battery, unlike a conventional engine driven vehicle.

In the case of the engine driven vehicle, since an idle torque of an engine is transmitted to a torque converter and transmission even in a situation where a driver does not press an accelerator pedal and a brake pedal during driving, a creep driving is performed in which a vehicle speed is accelerated to a constant speed at a low speed lower than the constant speed and is gradually reduced at a high speed higher than the constant speed.

This creep driving is a phenomenon that occurs naturally without any special control when the engine of an existing engine driven vehicle is in operation. In contrast, a natural creeping operation may not be possible in an environmentally friendly vehicle that can be driven by the power of the motor.

Therefore, the eco-friendly vehicle controls the motor so that a creep torque is outputted to each wheel, when the accelerator pedal and the brake pedal are depressed, to create a feeling of driving similar to the creep driving of the existing engine-driven vehicle.

On the other hand, since conventional technology cannot flexibly change a maximum creep speed, it is inconvenient for the driver to operate the accelerator pedal and the brake pedal in accordance with a distance from a preceding vehicle.

SUMMARY

According to an aspect of the present disclosure, a vehicle and a method of controlling the vehicle can minimize operation of a pedal by a driver and provide the convenience of driving by flexibly controlling a maximum creep speed during a creep driving in a traffic congestion section.

According to additional aspects of the present disclosure, a vehicle and a method of controlling the vehicle can improve fuel efficiency by selectively applying an EV (Electric Vehicle) mode driving among different driving modes (e.g., an EV mode, a Series EV mode, an HEV mode, etc.) in an HEV (Hybrid Electric Vehicle) or a PHEV (Plug-in Hybrid Electric Vehicle).

In accordance with an aspect of the present disclosure, a vehicle may include: a radar configured to obtain speed information of a preceding vehicle and distance information to the preceding vehicle; a sensor configured to acquire behavior information of the vehicle; a controller configured to determine whether or not the vehicle has entered a traffic congestion section based on the behavior information of the vehicle, to determine a safety distance and a surplus distance related to the preceding vehicle, to determine a maximum creep speed and a creep torque based on the surplus distance, and to control operation of at least one of a motor or an engine to transmit the creep torque to a wheel.

The controller may determine that the vehicle has entered the traffic congestion section when an average speed value of the vehicle is less than a predetermined value and a frequency of operating an accelerator pedal or a brake pedal is equal to or greater than a predetermined number of times.

The vehicle may further include a communicator configured to communicate with an external server. The controller may acquire traffic information of a current driving road from the external server, and to determine that the vehicle has entered the traffic congestion section when a ratio of a speed limit of the current driving road to a current speed of the vehicle is equal to or greater than a predetermined value for a predetermined period of time.

The vehicle may further include a memory configured to store maximum creep speed information corresponding to the surplus distance, wherein the controller may determine a difference between the distance to the preceding vehicle and the safety distance to be the surplus distance and to obtain the maximum creep speed information from the memory.

The controller may determine a sum of a reaction distance which is a moving distance until braking is started after a danger related to the preceding vehicle is detected and a braking distance which is a moving distance until the vehicle is stopped after the braking is started, to be the safety distance.

The controller may determine the reaction distance by applying a safety factor to the speed of the vehicle at a time when the danger related to the preceding vehicle is detected.

The controller may update the creep torque based on a difference between the maximum creep speed and a current speed of the vehicle.

The controller may determine a 'Distance to Empty' (DTE) by a battery, and compare the DTE with the distance to the preceding vehicle to determine operation of at least one of the motor or the engine.

The controller may determine to drive in an EV mode and control operation of the motor when the DTE is equal to or greater than the distance to the preceding vehicle.

The controller may determine to drive in a Series EV mode and control operations of both of the engine and the motor when the DTE is less than the distance to the preceding vehicle and a charging energy for charging the battery is greater than an energy corresponding to the creep torque.

The controller may determine to drive in an HEV mode and control operations of both of the engine and the motor when the DTE is less than the distance to the preceding vehicle and a charging energy for charging the battery is less than an energy corresponding to the creep torque.

In accordance with another aspect of the present disclosure, a method of controlling a vehicle includes: obtaining, by a radar, speed information of a preceding vehicle and distance information to the preceding vehicle; acquiring, by a controller, behavior information of the vehicle; determining, by the controller, whether or not the vehicle has entered a traffic congestion section based on the behavior information of the vehicle; determining, by the controller, a safety distance and a surplus distance related to the preceding vehicle; determining, by the controller, a maximum creep speed and a creep torque based on the surplus distance; and controlling, by the controller, operation of at least one of a motor or an engine to transmit the creep torque to a wheel of the vehicle.

The determining whether or not the vehicle has entered a traffic congestion section may include determining that the vehicle has entered the traffic congestion section when an average speed value of the vehicle is less than a predetermined value and a frequency of operating an accelerator pedal or a brake pedal is equal to or greater than a predetermined number of times.

The method may further include: acquiring traffic information of a current driving road from an external server; and wherein the determining whether or not the vehicle has entered a traffic congestion section may include determining that the vehicle has entered the traffic congestion section when a ratio of a speed limit of the current driving road to a current speed of the vehicle is equal to or greater than a predetermined value for a predetermined period of time.

The determining a safety distance and a surplus distance may include determining a difference between the distance to the preceding vehicle and the safety distance to be the surplus distance; and obtaining maximum creep speed information corresponding to the surplus distance from a memory.

The determining a safety distance and a surplus distance may include determining a sum of a reaction distance which is a moving distance until braking is started after a danger related to the preceding vehicle is detected and a braking distance which is a moving distance until the vehicle is stopped after the braking is started, to be the safety distance.

The determining a safety distance and a surplus distance may include determining the reaction distance by applying a safety factor to the speed of the vehicle at a time when the danger related to the preceding vehicle is detected.

The determining a maximum creep speed and a creep torque may include updating the creep torque based on a difference between the maximum creep speed and a current speed of the vehicle.

The controlling operation of at least one of a motor or an engine may include calculating a 'Distance To Empty' (DTE) by a battery; and comparing the DTE with the distance to the preceding vehicle to determine operation of at least one of the motor or the engine by.

The controlling operation of at least one of a motor or an engine may include determining to drive in an EV mode and controlling operation of the motor when the DTE is equal to or greater than the distance to the preceding vehicle.

The controlling operation of at least one of a motor or an engine may include determining to drive in a Series EV mode and controlling operations of both of the engine and the motor when the DTE is less than the distance to the preceding vehicle and a charging energy for charging the battery is greater than an energy corresponding to the creep torque.

The controlling operation of at least one of a motor or an engine may include determining to drive in an HEV mode and controlling operations of both of the engine and the motor when the DTE is less than the distance to the preceding vehicle and a charging energy for charging the battery is smaller than an energy corresponding to the creep torque.

BRIEF DESCRIPTION OF THE DRAWINGS

These and/or other aspects of the present disclosure will become apparent and more readily appreciated from the following description of the embodiments, taken in conjunction with the accompanying drawings.

FIG. 5 is a table for explaining a safety factor used to calculate the safety distance.

FIG. 6 is a table for explaining a setting of a maximum creep speed based on a surplus distance.

DETAILED DESCRIPTION

Figure 1:
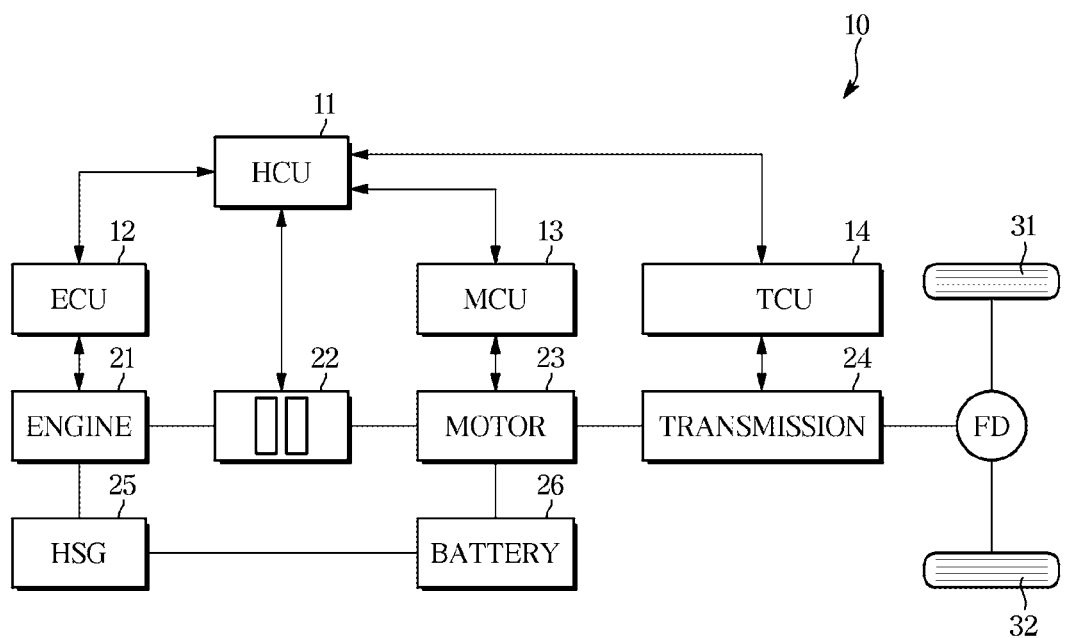
FIG. 1 shows a power system and a control system of a vehicle according to an embodiment.

Like reference numerals refer to like elements throughout the specification. Not all elements of embodiments of the disclosure will be described, and description of what are commonly known in the art or what overlap each other in the embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

It will be understood that, although the terms first, second, third, etc., may be used herein to describe various elements, it should not be limited by these terms. These terms are only used to distinguish one element from another element. As used herein, the singular forms "a," "an" and "the" are intended to include the plural forms as well, unless the context clearly indicates otherwise.

As used herein, the terms "portion," "unit," "block," "member," or "module" refer to a unit that can perform at least one function or operation. For example, these terms may refer to at least one process which is performed by at least one piece of hardware such as a field-programmable gate array (FPGA) and an application specific integrated circuit (ASIC), and at least one piece of software stored in a memory or a processor.

An identification code is used for the convenience of the description but is not intended to illustrate the order of each step. Each of the steps may be implemented in an order different from the illustrated order unless the context clearly indicates otherwise.

The principle and embodiments of the disclosure will now be described with reference to the accompanying drawings.

FIG. 1 shows a power system and a control system of a vehicle according to an exemplary embodiment of the present disclosure.

Referring to FIG. 1, the power system and the control system of a vehicle 10 according to one aspect of the present disclosure include an HCU (Hybrid Control Unit) 11, an ECU (Engine Control Unit) 12, an MCU (Motor Control Unit) 13, a TCU (Transmission Control Unit) 14, an engine 21, an engine clutch 22, a motor 23, a transmission 24, an HSG (Hybrid Starter and Generator) 25 and a battery 26.

The vehicle 10 according to one aspect of the present disclosure may be a hybrid electric vehicle (HEV) or a plug-in hybrid electric vehicle (PHEV).

In addition, the vehicle 10 according to one aspect of the present disclosure may be an electric vehicle (EV) or a fuel cell vehicle. In the case where the vehicle 10 is the electric vehicle (EV) or the fuel cell vehicle, the engine 21 and configurations 11, 12, 22, 25 associated with the engine 21 are able to be omitted.

In other words, the vehicle 10 according to one aspect of the present disclosure may be an environmentally friendly vehicle that can be operated by the force of the motor 23. The vehicle 10 can support creep driving in which a vehicle speed is accelerated to a constant speed at a low speed lower than the constant speed and is gradually reduced at a high speed higher than the constant speed, even in a situation where a driver does not press an accelerator pedal and a brake pedal during driving. For this, the vehicle 10 can control the motor 23 so that a creep torque is output to each of wheels 31 and 32 when there is no operation of the accelerator pedal and the brake pedal by the driver.

The HCU 11 is a top-level controller for controlling the overall operation of the vehicle 10. In addition, the HCU 11 integrally manages the control of the other controllers 12, 13, and 14. For this, the HCU 11 exchanges information with each of the controllers 12, 13, and 14 and performs cooperative control to control the engine 21 and output torque of the motor 23.

Various devices and the controllers 11, 12, 13, 14 provided in the vehicle 10 can communicate with each other through a vehicle communication network NT. For example, the HCU 11 may be connected to the other controllers 12, 13, 14 via a CAN (Controller Area Network) communication line. In addition to CAN, Ethernet, Media Oriented Systems Transport (MOST), Flexray, and Local Interconnect Network (LIN) may be used.

The ECU 12 can control the operation of the engine 21. The MCU 13 can control the operation of the motor 23. The TCU 14 can control the operation of the transmission 24. The engine 21 can output power as the power source when the vehicle 10 starts up. However, as described above, the engine 21 may be omitted depending on the type of the vehicle 10.

The engine clutch 22 is disposed between the engine 21 and the motor 23 and receives the control signal of the HCU 11. The engine clutch 22 selectively receives a control signal of the HCU 11 and selectively connects the engine 21 and the motor 23 according to a driving mode of the vehicle 10. For example, the hybrid vehicle HEV may be in an EV (Electric Vehicle) mode that drives with torque of only the motor 23 depending on whether the engine clutch 22 is engaged or an HEV (Hybrid Electric Vehicle) mode that drives by the sum of an engine torque and a motor torque.

The motor 23 generates torque by three-phase alternating voltage applied through an inverter in the battery 26 and transmits the creep torque to the wheels 31 and 32 during the creep driving to perform acceleration or deceleration. In addition, the motor 23 can operate as a generator in the engine driving mode to provide regenerative energy to the battery 26, so that the battery 26 can be charged.

The transmission 24 can be supplied with an input torque as the sum of the output torque of the engine 21 and the output torque of the motor 23 that are determined by engagement or disengagement of the engine clutch 22. When a certain gear ratio is determined according to the speed and driving condition of the vehicle 10 or according to a user's choice, the transmission 24 can output the input torque corresponding to the determined gear ratio to each of the wheels 31 and 32. The transmission 24 can transmit the torque input from the engine 21 or the motor 23 to each of the wheels 31 and 32 based on the set gear ratio.

The HSG (Hybrid Starter and Generator) 25 can control the engine 21 to start in accordance with a state of charge (SOC) of the battery 26, and perform power generation using the output of the engine 21. The HSG 25 can supply electric power through the electric power generation to the battery 26 to charge the battery 26.

The battery 26 may include a plurality of unit cells and can store energy (for example, a direct voltage from 400 V to 450 V) for driving the motor 23.

Figure 2:
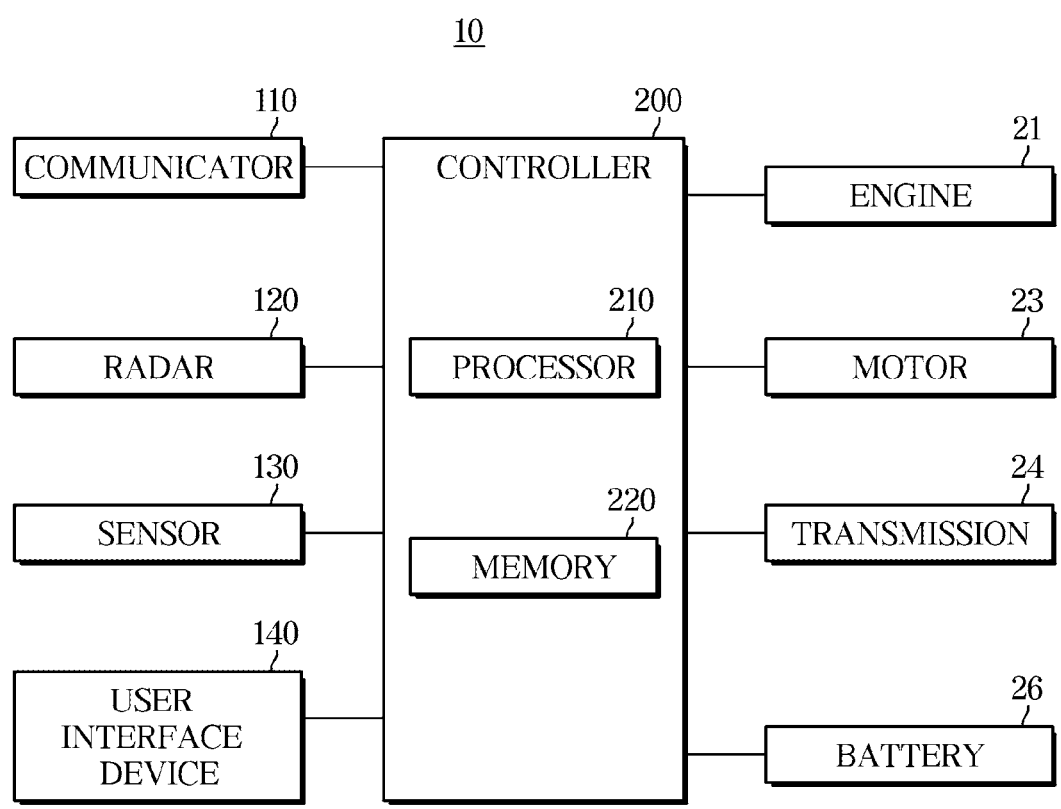
FIG. 2 is a control block diagram of the vehicle according to an exemplary embodiment of the present disclosure.

FIG. 2 is a control block diagram of the vehicle according to an exemplary embodiment of the present disclosure.

Referring to FIG. 2, the vehicle 10 may include a communicator 110, a radar 120, a sensor 130, a user interface device 140, and a controller 200. The vehicle 10 may also include the engine 21, the motor 23, the transmission 24 and the battery 26, as described above.

The communicator 110 can perform communication with an external server (not shown) using various communication methods. The communicator 110 may be a hardware device implemented by various electronic circuits, e.g., processor, to transmit and receive signals or data to/from the external server (not shown) by using various communication methods.

In FIG. 2, the communicator 110 is shown as a single component for transmitting and receiving signals, but is not limited thereto. The communicator 110 may include a transmitter (not shown) for transmitting a signal and a receiver (not shown) for receiving a signal.

The controller 200 can acquire traffic information of the current driving road from the external server through the communicator 110. Traffic information of the current driving road may include speed limit information, traffic congestion information, and the like.

The radar 120 can acquire positional information, distance information, speed information, and the like of an object (e.g., a preceding vehicle, a pedestrian, etc.). The radar 120 is provided on the front, rear, and side of the vehicle 10, and can transmit and receive radio waves. The radar 120 can calculate a distance to the preceding vehicle based on a phase difference (or time difference) between transmission radio waves and reflection radio waves. The radar 120 can calculate the speed of the preceding vehicle or the relative speed based on the frequency difference between the transmission radio waves and the reflection radio waves. Meanwhile, the radar 120 may be implemented as a Lidar.

The sensor 130 can obtain behavior information of the vehicle 10. Various types of the sensors 130 for acquiring the behavior information of the vehicle 10 may be provided in the vehicle 10. For example, the vehicle 10 may include a speed sensor that detects the speed of the wheel, an acceleration sensor that detects the acceleration of the vehicle 10, a yaw rate sensor that detects a change in angular velocity, a gyro sensor that detects inclination of the vehicle 10, a steering angle sensor that detects a rotation and steering angle of a steering wheel, an accelerator pedal sensor (APS) that detects the position and frequency of operating the accelerator pedal, a braking pedal sensor (BPS) that detects the position and frequency of operating the brake pedal.

The user interface device 140 may receive a user input and may output various information related to the function and status of the vehicle 10. The user interface device 140 may include an input device (not shown) and an output device (not shown).

The input device of the user interface device 140 may be provided in a center fascia (not shown) installed at the center of a dashboard inside the vehicle 10 as a device for receiving the user's input. For example, the input device may include a physical button, a knob, a touch pad, a touch screen, a stick type operation device, and/or a track ball.

The output device of the user interface device 140 is a device for outputting various information related to the function and status of the vehicle 10, and may include a cluster, an AVN apparatus, and a display of a head unit. Further, the output device may include a speaker that outputs an audio signal.

The display may include, for example, a liquid crystal display (LCD), a thin film transistor-liquid crystal display (TFT LCD), an organic light-emitting diode (OLED), a flexible display, a 3D display, a transparent display, a head-up display (HUD), or the like.

The user may enter a selection of the driving mode of the vehicle 10 using the user interface device 140.

The driving mode of the vehicle 10 may include an EV (Electric Vehicle) mode that drives with the torque of the motor 23, an HEV (Hybrid Electric Vehicle) mode in which the vehicle drives with the sum of the torque of the engine 21 and the torque of the motor 23, and a series EV mode in which the motor 23 is driven while charging the battery 26 with the electric power produced by using the energy generated by operating the engine 21.

In addition, the driving mode of the vehicle 10 may include a normal mode, a sports mode in which the operation response to the pedal and the steering wheel is higher than that in the normal mode and the acceleration or deceleration is greater than that in the normal mode, an ECO mode in which the operation response to the pedal and the steering wheel is low and the acceleration or deceleration is smaller than that in the normal mode.

In the sports mode, the speed of the vehicle 10 can reach the maximum creep speed faster than in the normal mode. In the eco mode, the speed of the vehicle 10 can reach maximum creep speed more slowly than in the normal mode. In the sports mode, the user can feel the speed change more rapidly. In the eco mode, the energy efficiency can be increased according to the slow speed change. That is, in the sports mode, the creep torque can be set to be higher than the creep torque in the normal mode, and in the eco mode, the creep torque can be set to be lower than the creep torque in the normal mode.

The user interface device 140 may display the remaining amount of the battery 26 and the battery state (State Of Charge, SOC) which include over-voltage, over-current, over-temperature, etc. In addition, the user interface device 140 can further display information such as a distance to empty (DTE) by the battery 26, a distance to empty (DTE) by fuel, a remaining amount of fuel, and the like.

The controller 200 may include at least one memory 220 in which programs and/or instructions for performing the above-described operations and the operations described below are stored, and at least one processor 210 for executing the stored programs and/or instructions. When there are a plurality of the memories 220 and the processor 210, they may be integrated in one semiconductor circuit or may be provided at physically separated positions.

The memory 220 may be implemented as at least one of a nonvolatile memory device such as a cache, PROM (Programmable ROM), EPROM (Erasable Programmable ROM), EEPROM (Electrically Erasable Programmable ROM) and Flash memory; a volatile memory device such as RAM (Random Access Memory); or a storage medium such as a hard disk drive (HDD) and CD-ROM, but is not limited thereto.

The controller 200 may include the HCU (Hybrid Control Unit) 11, the ECU (Engine Control Unit) 12, the MCU (Motor Control Unit) 13 and the TCU (Transmission Control Unit) 14. The controller 200 can control the operation of the various devices of the vehicle 10 based on a predefined program, instructions and/or algorithm.

Hereinafter, the operation of the controller 200 will be described in detail.

First, the creep driving can be performed in a situation where the driver does not press the accelerator pedal and the brake pedal during driving. During the creep driving, the vehicle 10 is accelerated to a constant speed when the speed of the vehicle 10 is at a low speed lower than the constant speed, and is gradually decelerated when the speed of the vehicle 10 is higher than the constant speed.

However, the conventional technique cannot flexibly change the maximum creep speed. There has been an inconvenience that the driver must continuously operate the accelerator pedal and the brake pedal in accordance with the distance from the preceding vehicle. In order to solve such a problem, the present invention controls the maximum creep speed flexibly in accordance with the distance from the preceding vehicle when creeping. Therefore, the present invention can minimize the operation of the pedal by the driver and provide ease of operation.

Figure 3:
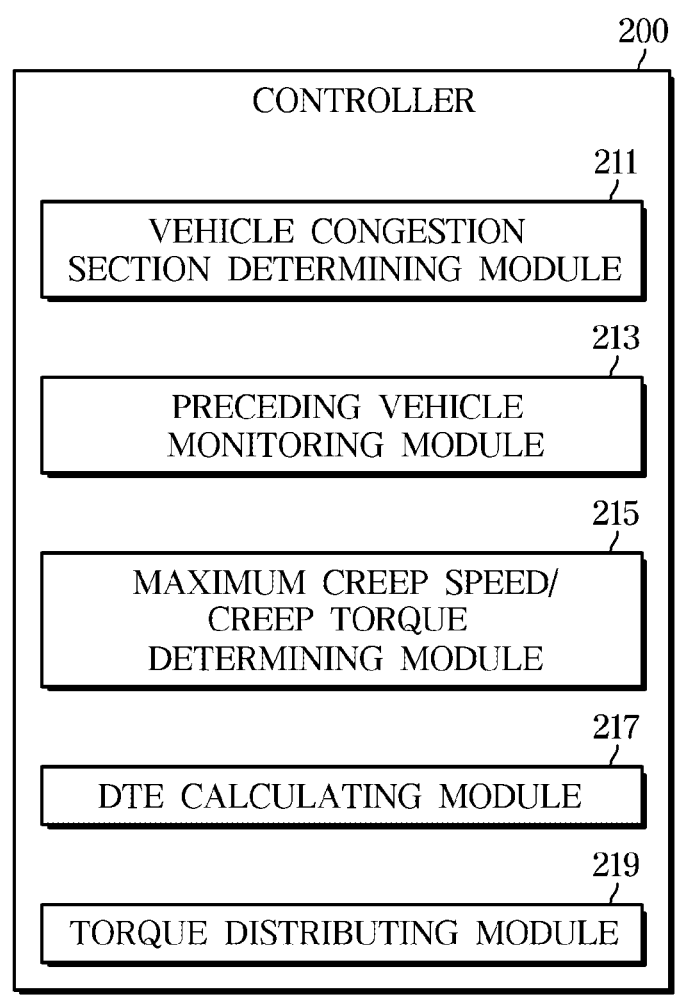
FIG. 3 is a detailed block diagram of a controller.
Figure 4:
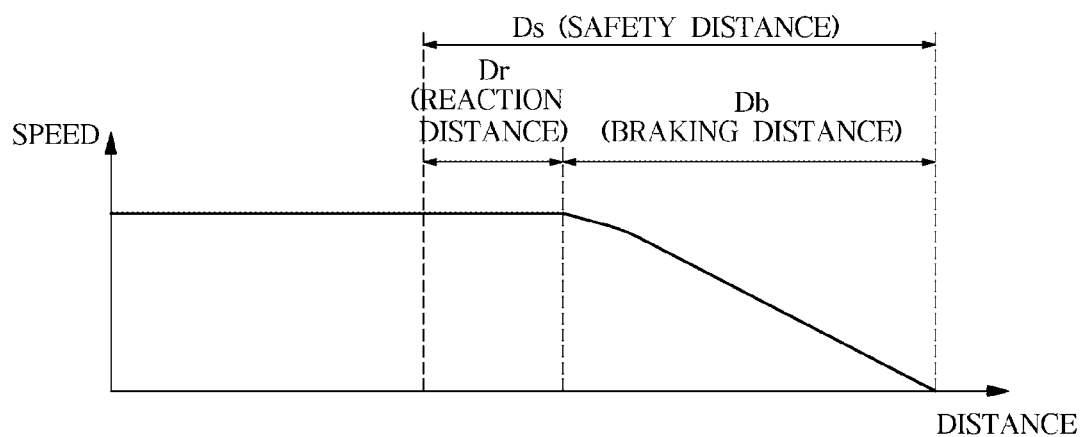
FIG. 4 is a graph for illustrating a safety distance.
Figure 7:
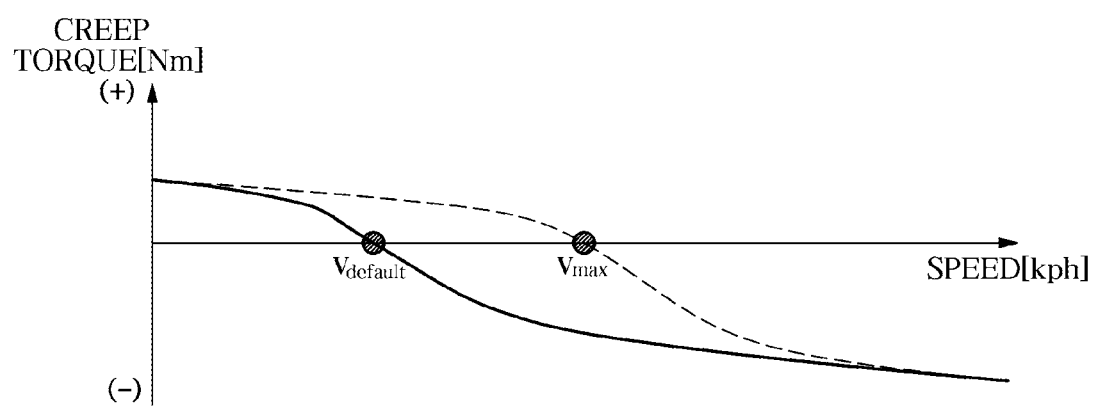
FIG. 7 is a graph showing a relationship between the maximum creep speed and a creep torque.

FIG. 3 is a detailed block diagram of a controller. FIG. 4 is a graph for illustrating a safety distance. FIG. 5 is a table for explaining a safety factor used to calculate the safety distance. FIG. 6 is a table for explaining a setting of a maximum creep speed based on a surplus distance. FIG. 7 is a graph showing a relationship between the maximum creep speed and a creep torque.

Referring to FIG. 3, the controller 200 may include a vehicle congestion section determining module 211, a preceding vehicle monitoring module 213, a maximum creep speed/creep torque determining module 215, a DTE calculating module 217, and a torque distributing module 219. It is to be noted that the controller 200 is divided into respective modules for convenience of explanation. The processor 210 may perform various functions of following modules 211, 213, 215, 217 and 219 of the controller 200. The modules 211, 213, 215, 217 and 219 described below may be implemented with software instructions executed on the processor 210.

The vehicle congestion section determining section 211 can determine whether or not the vehicle enters the traffic congestion section based on the behavior information of the vehicle 10. Specifically, when the average value of the speed of the vehicle 10 is equal to or smaller than a predetermined value for a predetermined period of time and the frequency of operation of the accelerator pedal or the frequency of operation of the brake pedal is equal to or greater than a predetermined number, the vehicle congestion section determining section 211 can determine that the vehicle 10 has entered the traffic congestion section. For example, if the speed of the vehicle 10 is 40 km/h or less for 30 seconds and the frequency of operation of the accelerator pedal or the frequency of operation of the brake pedal is five or more times, it can be judged that the vehicle 10 has entered the traffic congestion section.

In addition, the vehicle congestion section determining section 211 can determine that the vehicle 10 enters the traffic congestion section when a ratio of a speed limit of the current driving road and a current speed of the vehicle is equal to or greater than a predetermined value for a predetermined period of time. The speed limit of the current driving road can be obtained from the traffic information of the current driving road obtained from the external server (not shown).

For example, when the current speed limit of the current driving road is 100 km/h and the current speed of the vehicle 10 is maintained at 25 km/h for 30 seconds, the ratio of the speed limit of the current driving road to the current speed of the vehicle 10 is 4 (=100/25). Let the predetermined value be 1. Since the ratio of the current speed limit of the current driving road to the current speed of the vehicle 10 is maintained at a value larger than a predetermined value for a predetermined period of time (30 seconds), it can be determined that the vehicle 10 has entered the traffic congestion section.

The preceding vehicle monitoring module 213 receives a speed $V_f$ of the preceding vehicle and a distance $D_f$ to the preceding vehicle, from the radar 120. The preceding vehicle monitoring module 213 can calculate a safety distance $D_s$ and a surplus distance $D_c$ related to the preceding vehicle by using the speed $V_f$ of the preceding vehicle and the distance $D_f$ to the preceding vehicle.

Specifically, referring to FIG. 4, the preceding vehicle monitoring module 213 can calculate a sum of a reaction distance $D_r$ which is a moving distance until braking is started after a danger related to the preceding vehicle is detected and a braking distance $D_b$ which is a moving distance until the vehicle is stopped after the braking is started, as the safety distance $D_s$.

Specifically, referring to FIG. 5, the preceding vehicle monitoring module 213 can calculate the reaction distance $D_r$ by applying a safety factor $F_{reaction}$ to the speed of the vehicle 10 at the time when the danger related to the preceding vehicle is detected. The safety factor $F_{reaction}$ may be set higher as the speed of the vehicle 10 at the time when the danger to the preceding vehicle is detected is higher. Since the values shown in FIG. 5 are illustrative, the relationship between the speed of the vehicle 10 and the safety factor is not limited to the values shown in FIG. 5.

The braking distance $D_b$ can be calculated from a speed $V_r$ of the vehicle 10 at the braking start time and the speed $V_f$ of the preceding vehicle.

The preceding vehicle monitoring module 213 can calculate the difference between the distance $D_f$ to the preceding vehicle and the safety distance $D_s$ as the surplus distance $D_c$. The surplus distance $D_c$ serves as a basis for controlling the creep torque.

The reaction distance $D_r$, the braking distance $D_b$, the safety distance $D_s$, and the surplus distance $D_c$ can be expressed by Equation 1 below.

$$D_r = F_{reaction} * V_c$$

$$D_b = (V_r^2 - V_f^2)/(2a)$$

$$D_s = D_r + D_b$$

$$D_c = D_f - D_s \qquad \text{[Equation 1]}$$

($D_r$: Reaction distance, $F_{reaction}$: Safety factor, $V_c$: The speed of the vehicle at the time when the danger to the preceding vehicle is detected, $D_b$: Braking distance, $V_r$: Vehicle speed at start of braking, $V_f$: The speed of the preceding vehicle, a: Vehicle acceleration, $D_s$: Safety distance, $D_c$: Surplus distance, $D_f$: Distance to the preceding vehicle)

The maximum creep speed/creep torque determining module 215 can calculate a maximum creep speed V max and the creep torque based on the surplus distance $D_c$. The maximum creep speed V max information corresponding to the surplus distance $D_c$ may be stored in the memory 220. That is, the maximum creep speed/creep torque determining module 215 can load the maximum creep speed V max corresponding to the surplus distance $D_c$ from the memory 220.

Referring to FIG. 6, the maximum creep speed V max may increase with an increase of the surplus distance $D_c$. A default creep speed $V_{default}$ is set to the maximum creep speed when the surplus distance $D_c$ is 0 or a negative value. When the value of the surplus distance $D_c$ is 0, the vehicle 10 follows the preceding vehicle while maintaining the safety distance $D_s$ with the preceding vehicle.

Referring to FIG. 7, the maximum creep speed/creep torque determining module 215 can calculate the creep torque to be transmitted to the wheels 31 and 32 so that the vehicle 10 can be creeped at the maximum creep speed V max.

Specifically, when the current speed of the vehicle 10 is less than the maximum creep speed, positive (+) creep torque may be applied to the wheels 31 and 32 to increase the creep driving speed of the vehicle 10. In addition, when the current speed of the vehicle 10 is equal to or greater than the maximum creep speed, negative (−) creep torque may be applied to the wheels 31 and 32 so that the creep driving speed of the vehicle 10 may decrease. The creep torque can be adjusted so that the current speed of the vehicle 10 converges to the maximum creep speed. That is, the creep torque may decrease or increase exponentially.

Further, the maximum creep speed/creep torque determining module 215 can update the creep torque based on the difference between the maximum creep speed V max and the current speed of the vehicle (current creep driving speed). For example, when the current speed (creep driving speed) of the vehicle 10 is increased, the surplus distance $D_c$ can be reduced. The maximum creep speed and creep torque need to be updated according to the reduced surplus distance $D_c$. In other words, the controller 200 performs feedback control on the creep torque based on the difference between the maximum creep speed V max and the current speed of the vehicle (current creep driving speed).

In this manner, the vehicle 10 can appropriately follow the preceding vehicle even if there is no operation of the accelerator pedal or the brake pedal by adjusting the maximum creeping speed V max in proportion to the surplus distance $D_c$.

The DTE calculating module 217 can calculate the DTE (Distance to Empty) by the battery 26. The DTE (Distance to Empty) can be calculated based on the state information of the battery 26. The state information of the battery 26 may include the state of charge (SOC) of the battery 26, electric energy mileage information of the vehicle 10, and the like.

The torque distributing module 219 can control operation of at least one of the motor 23 and the engine 21 so as to transmit the creep torque to the wheel. The torque distributing module 219 can determine the operation of at least one of the motor 23 and the engine 21 by comparing the DTE by the battery 26 with the distance $V_f$ to the preceding vehicle.

Specifically, when the DTE by the battery 26 is equal to or greater than the distance $V_f$ to the preceding vehicle, the torque distributing module 219 determines to drive in the EV mode, and controls at least one of the motor 23 and the engine 21 so that the creep torque is transmitted to the wheels 31 and 32.

When the DTE by the battery 26 is less than the distance $V_f$ to the preceding vehicle and the charging energy for charging the battery 26 is greater than the energy corresponding to the creep torque, the torque distributing module 219 determines to drive in the Series EV mode and control the operation of the engine 21 and the motor 23. That is, the battery 26 is charged by the energy generated from the operating of the engine 21, and the creep torque can be provided from the motor 23.

When the DTE is less than the distance $V_f$ to the preceding vehicle and the charging energy to charge the battery 26 is less than the energy corresponding to the creep torque, the torque distributing module 219 may determine to drive in the HEV mode and control the operation of the engine 21 and the motor 23. That is, the creep torque may be provided from the engine 21 and the motor 23.

In this manner, the fuel economy can be improved by selectively applying an EV (Electric Vehicle) mode driving of the vehicle among different driving modes (e.g., an EV mode, a Series EV mode, an HEV mode, etc.).

Figure 8:
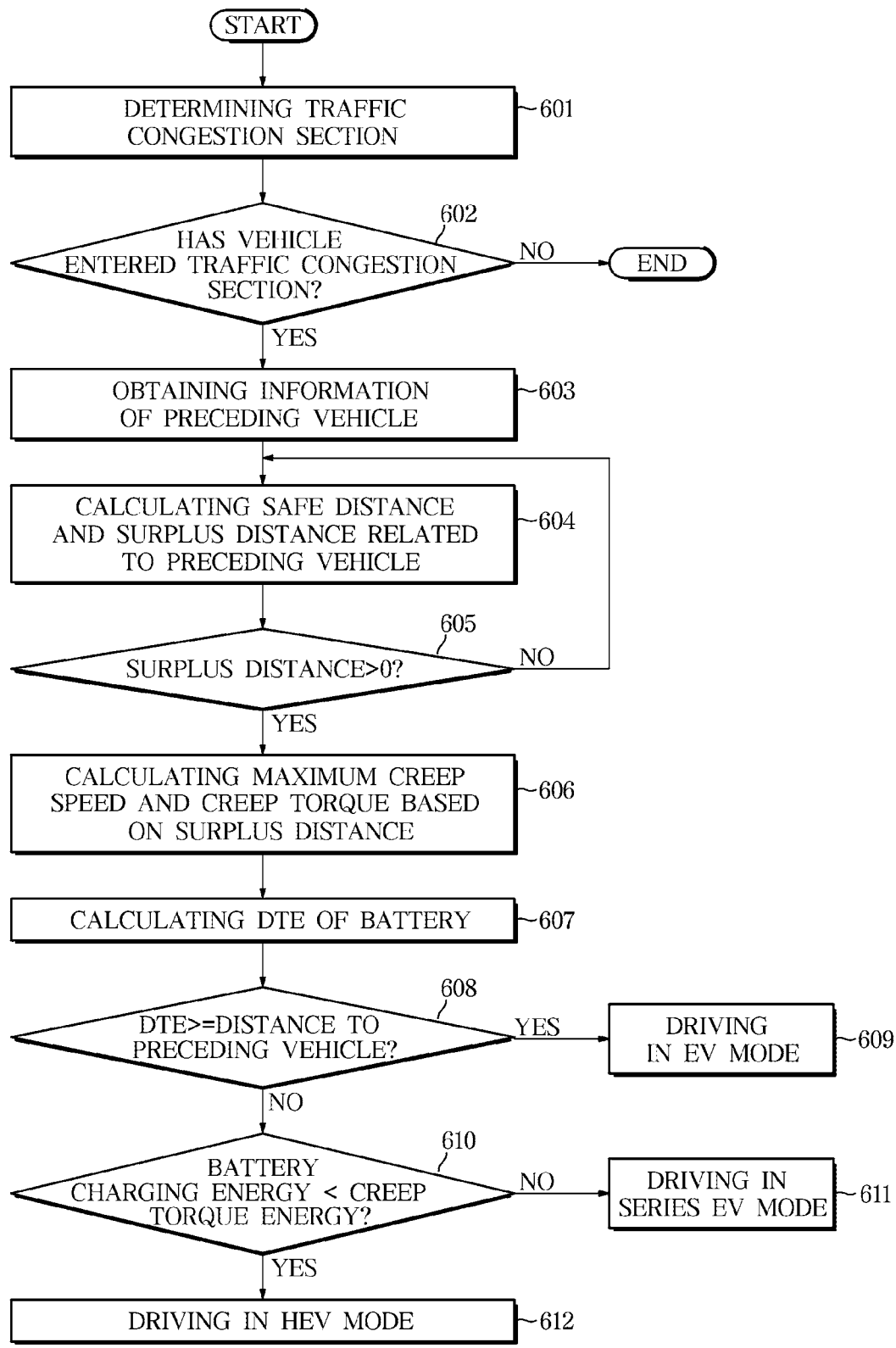
FIG. 8 is a flowchart for explaining a method of controlling the vehicle according to an exemplary embodiment of the present disclosure.

FIG. 8 is a flowchart for explaining a method of controlling the vehicle according to an exemplary embodiment of the present disclosure.

As described above, the vehicle 10 includes the controller 200 that controls the operation of various devices based on a predefined program, instructions and/or algorithm. The controller 200 includes the HCU (Hybrid Control Unit) 11, the ECU (Engine Control Unit) 12, the MCU (Motor Control Unit) 13 and the TCU (Transmission Control Unit) 14.

Referring to FIG. 8, the controller 200 can determine whether the vehicle enters the traffic congestion section based on the behavior information of the vehicle 10 (601, 602). Specifically, when the average value of the speed of the vehicle 10 is equal to or smaller than the predetermined value for a predetermined time, and the frequency of operation of the accelerator pedal or and the frequency of operation of the brake pedal is equal to or greater than a predetermined number, the controller 200 can determine that the vehicle 10 has entered the traffic congestion section. For example, if the speed of the vehicle 10 is 40 km/h or less for 30 seconds and the frequency of operation of the accelerator pedal or the frequency of operation of the brake pedal is five or more times, it can be judged that the vehicle 10 has entered the traffic congestion section.

In addition, the controller 200 can determine that the vehicle 10 enters the traffic congestion section when a ratio of a speed limit of the current driving road and a current speed of the vehicle 10 is equal to or greater than a predetermined value for a predetermined period of time.

When the vehicle 10 enters the congestion section, the controller 200 can acquire the information of the preceding vehicle (603). That is, the controller 200 can receive the speed $V_f$ of the preceding vehicle and the distance $D_f$ to the preceding vehicle from the radar 120. The controller 200 can calculate the safety distance $D_s$ and the surplus distance $D_c$ related to the preceding vehicle by using the speed $V_f$ of the preceding vehicle and the distance $D_f$ to the preceding vehicle (604).

Referring to FIG. 6, when the calculated surplus distance $D_c$ is 0 or a negative value, the controller 200 may set the maximum creep speed V max to the default creep speed $V_{default}$ and calculate the creep torque corresponding to the default creep speed $V_{default}$. Further, when the calculated surplus distance $D_c$ is larger than 0, the controller 200 can calculate the maximum creep speed V max and the creep torque based on the surplus distance $D_c$ (605, 606). The controller 200 can calculate the creep torque to be transmitted to the wheels 31 and 32 so that the vehicle 10 can be creeped at the maximum creep speed V max.

Since the method for calculating the reaction distance $D_r$, the braking distance $D_b$, the safety distance $D_s$ and the surplus distance $D_c$ has been described in the foregoing, duplicate descriptions are omitted.

The controller 200 can calculate the DTE (Distance to Empty) by the battery 26 (607).

The controller 200 may control operation of at least one of the motor 23 and the engine 21 to transmit the creep torque to the wheel. The controller 200 can determine the operation of at least one of the motor 23 and the engine 21 by comparing the DTE by the battery 26 to the distance $V_f$ to the preceding vehicle (608).

When the DTE by the battery 26 is equal to or greater than the distance $V_f$ to the preceding vehicle, the controller 200 may determine to drive in the EV mode, and control the motor 23 so that the creep torque caused by the operation of the motor 23 is transmitted to the wheels 31 and 32 (609).

When the DTE by the battery 26 is less than the distance $V_f$ to the preceding vehicle and the charging energy for charging the battery 26 is greater than the energy corresponding to the creep torque, the controller 200 may determine to drive in the Series EV mode and control the operation of the engine 21 and the motor 23 (610, 611). That is, the battery 26 is charged by the energy generated from the operating of the engine 21, and the creep torque can be provided from the motor 23.

When the DTE is less than the distance $V_f$ to the preceding vehicle and the charging energy to charge the battery 26 is less than the energy corresponding to the creep torque, the controller 200 may determine to drive in the HEV mode and control the operation of the engine 21 and the motor 23 (610, 612). That is, the creep torque may be provided from the engine 21 and the motor 23.

According to the vehicle of an aspect and the method of controlling the vehicle as described above, it is possible to minimize operation of the pedal by the driver and provide the convenience of driving by flexibly controlling the maximum creep speed during the creep driving in the traffic congestion section.

Further, according to the vehicle of another aspect and the method of controlling the vehicle, it is possible to improve fuel efficiency by selectively applying an EV (Electric Vehicle) mode driving among different driving modes (e.g., an EV mode, a Series EV mode, an HEV mode, etc.) in an HEV (Hybrid Electric Vehicle) or a PHEV (Plug-in Hybrid Electric Vehicle).

Furthermore, the disclosed exemplary embodiments may be implemented in the form of a recording medium storing instructions that are executable by a computer. The instructions may be stored in the form of a program code, and when executed by a processor, the instructions may generate a program module to perform operations of the disclosed exemplary embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. A vehicle comprising:
a radar configured to obtain speed information of a preceding vehicle and distance information to the preceding vehicle;
a sensor configured to acquire behavior information of the vehicle;
a memory configured to store maximum creep speed information corresponding to the surplus distance; and
a controller configured to determine whether or not the vehicle has entered a traffic congestion section based on the behavior information of the vehicle, to determine a safety distance and a surplus distance related to the preceding vehicle, to determine a maximum creep speed and a creep torque based on the surplus distance, and to control operation of at least one of a motor or an engine to transmit the creep torque to a wheel of the vehicle,
wherein the controller is configured to determine a difference between the distance to the preceding vehicle and the safety distance to be the surplus distance and to obtain the maximum creep speed information from the memory.

2. The vehicle according to claim 1, wherein the controller is configured to determine that the vehicle has entered the traffic congestion section when an average speed value of the vehicle is less than a predetermined value and a frequency of operating an accelerator pedal or a brake pedal is equal to or greater than a predetermined number of times.

3. The vehicle according to claim 1, further comprising:
a communicator configured to communicate with an external server,
wherein the controller is configured to acquire traffic information of a current driving road from the external server, to determine that the vehicle has entered the traffic congestion section when a ratio of a speed limit of the current driving road to a current speed of the vehicle is equal to or greater than a predetermined value for a predetermined period of time.

4. The vehicle according to claim 1, wherein the controller is configured to determine a sum of a reaction distance which is a moving distance until braking is started after a danger related to the preceding vehicle is detected and a braking distance which is a moving distance until the vehicle is stopped after the braking is started, to be the safety distance, and
wherein the controller is configured to determine the reaction distance by applying a safety factor to the speed of the vehicle at a time when the danger related to the preceding vehicle is detected.

5. The vehicle according to claim 1, wherein the controller is configured to update the creep torque based on a difference between the maximum creep speed and a current speed of the vehicle.

6. The vehicle according to claim 1, wherein the controller is configured to determine a 'Distance to Empty' (DTE) by a battery, and to compare the DTE with the distance to the preceding vehicle to determine operation of at least one of the motor or the engine.

7. The vehicle according to claim 6, wherein the controller is configured to determine to drive in an EV mode and to control operation of the motor when the DTE is equal to or greater than the distance to the preceding vehicle.

8. The vehicle according to claim 6, wherein the controller is configured to determine to drive in a Series EV mode and to control operations of both of the engine and the motor when the DTE is less than the distance to the preceding vehicle and a charging energy for charging the battery is greater than an energy corresponding to the creep torque.

9. The vehicle according to claim 6, wherein the controller is configured to determine to drive in an HEV mode and to control operations of both of the engine and the motor when the DTE is less than the distance to the preceding vehicle and a charging energy for charging the battery is less than an energy corresponding to the creep torque.

10. A method of controlling a vehicle comprising:
obtaining, by a radar, speed information of a preceding vehicle and distance information to the preceding vehicle;
acquiring, by a controller, behavior information of the vehicle;
determining, by the controller, whether or not the vehicle has entered a traffic congestion section based on the behavior information of the vehicle;
determining, by the controller, a safety distance and a surplus distance related to the preceding vehicle;
determining, by the controller, a maximum creep speed and a creep torque based on the surplus distance; and
controlling, by the controller, operation of at least one of a motor or an engine to transmit the creep torque to a wheel of the vehicle,
wherein the determining a safety distance and a surplus distance comprises:
determining a difference between the distance to the preceding vehicle and the safety distance to be the surplus distance; and
obtaining maximum creep speed information corresponding to the surplus distance from a memory.

11. The method according to claim 10, wherein the determining whether or not the vehicle has entered a traffic congestion section comprises
determining that the vehicle has entered the traffic congestion section when an average speed value of the vehicle is less than a predetermined value and a frequency of operating an accelerator pedal or a brake pedal is equal to or greater than a predetermined number of times.

12. The method according to claim 10, further comprising:
acquiring traffic information of a current driving road from an external server,
wherein the determining whether or not the vehicle has entered a traffic congestion section comprises
determining that the vehicle has entered the traffic congestion section when a ratio of a limit speed of the current driving road to a current speed of the vehicle is equal to or greater than a predetermined value for a predetermined period of time.

13. The method according to claim 10, wherein the determining a safety distance and a surplus distance comprises:

determining a sum of a reaction distance which is a moving distance until braking is started after a danger related to the preceding vehicle is detected and a braking distance which is a moving distance until the vehicle is stopped after the braking is started, to be the safety distance; and determining the reaction distance by applying a safety factor to the speed of the vehicle at a time when the danger related to the preceding vehicle is detected.

14. The method according to claim 10, wherein the determining a maximum creep speed and a creep torque comprises updating the creep torque based on a difference between the maximum creep speed and a current speed of the vehicle.

15. The method according to claim 10, wherein the controlling operation of at least one of a motor or an engine comprises:

determining a 'Distance To Empty' (DTE) by a battery; and comparing the DTE with the distance to the preceding vehicle to determine operation of at least one of the motor or the engine.

16. The method according to claim 15, wherein the controlling operation of at least one of a motor or an engine comprises determining to drive in an EV mode and controlling operation of the motor when the DTE is equal to or greater than the distance to the preceding vehicle.

17. The method according to claim 15, wherein the controlling operation of at least one of a motor and an engine comprises determining to drive in a Series EV mode and controlling operations of both of the engine and the motor when the DTE is less than the distance to the preceding vehicle and a charging energy for charging the battery is greater than an energy corresponding to the creep torque.

18. The method according to claim 15, wherein the controlling operation of at least one of a motor and an engine comprises determining to drive in an HEV mode and controlling operations of both of the engine and the motor when the DTE is less than the distance to the preceding vehicle and a charging energy for charging the battery is smaller than an energy corresponding to the creep torque.

* * * * *